United States Patent [19]

Sontheimer

[11] 4,307,847

[45] * Dec. 29, 1981

[54] READILY INSTALLED FOOD PROCESSOR CUTTER TOOL WITH NEGATIVE BLADE LIFT

[76] Inventor: Carl G. Sontheimer, 14 Gray Oaks La., Greenwich, Conn. 06830

[*] Notice: The portion of the term of this patent subsequent to May 6, 1997, has been disclaimed.

[21] Appl. No.: 144,424

[22] Filed: Apr. 28, 1980

Related U.S. Application Data

[60] Division of Ser. No. 902,741, May 3, 1978, Pat. No. 4,200,244, which is a continuation of Ser. No. 747,412, Dec. 6, 1976, abandoned.

[51] Int. Cl.³ ............................................. B02C 18/12
[52] U.S. Cl. ................................................. 241/282.1
[58] Field of Search ................ 241/199.12, 277, 282.1, 241/282.2

[56] References Cited

U.S. PATENT DOCUMENTS

| | | | |
|---|---|---|---|
| 2,894,551 | 7/1959 | Otto | 241/199.12 X |
| 3,172,442 | 3/1965 | Otto | 241/282.2 |
| 3,493,022 | 2/1970 | Mantelet | 241/199.12 |
| 3,612,125 | 10/1971 | Krauth | 241/199.12 |
| 3,892,365 | 7/1975 | Verdun | 241/282.1 X |
| 3,970,258 | 7/1976 | Mantelet | 241/282.1 |

FOREIGN PATENT DOCUMENTS 295344 3/1954 Switzerland .................... 241/282.1

Primary Examiner—Howard N. Goldberg
Attorney, Agent, or Firm—Parmelee, Johnson, Bollinger & Bramblett

[57] ABSTRACT

In order to overcome the unexpected dynamic lifting action of an easily installed rotary cutter tool in a food processor as the lower blade revolves at relatively high velocity through food material, such as shelled nuts in making nut butter, a downward inclination in a forward direction is provided in at least the lower blade, near its outer tip. If desired, such an inclination may be incorporated into both blades of the cutter tool. This downward inclination of the blade surface to provide a negative angle of attack (−A) relative to the direction of rotation may be accomplished in a preferred embodiment by twisting the outer blade portion into a negative angle of attack relative to the remainder of the blade or by mounting the whole blade onto the hub at a negative angle of attack. Thus, as the lower blade moves at relatively high velocity through food material, there is a continuous impact of the food material against the downwardly inclined blade surface at least near the tip region producing a downward component of thrust for holding the tool hub down firmly seated in its proper relationship upon the rotating drive shaft.

3 Claims, 5 Drawing Figures

READILY INSTALLED FOOD PROCESSOR CUTTER TOOL WITH NEGATIVE BLADE LIFT

RELATED APPLICATIONS

This application is a division of copending application, Ser. No. 902,741, filed May 3, 1978, which issued as U.S. Pat. No. 4,200,244 on Apr. 29, 1980; which in turn was a continuation of copending application, Ser. No. 747,412, filed Dec. 6, 1976, and now abandoned.

FIELD OF THE INVENTION

The present invention relates to apparatus for preparing food, and in particular to multi-purpose kitchen apparatus in which a conveniently removable rotary food preparing tool having a plurality of thin rigid cutter blades is used for processing food material in the bottom of an upright working bowl.

BACKGROUND OF THE INVENTION

There is food processing apparatus of the type broadly set forth above having a working bowl or vessel with a motor-driven shaft projecting vertically upwards through the bottom of the bowl on which various selected rotary tools can be engaged to be driven by the shaft for performing various food processing operations as may be desired by the user. For further information about this type of food processing apparatus, the reader may refer to U.S. Pat. No. 3,892,365—Pierre Verdun, and to my prior U.S. Pat. No. 3,985,304.

In this apparatus, there is used a removable cutter tool having a plurality of thin rigid cutter blades secured to a hollow hub and extending outwardly from the hub. When the user installs this removable tool, its hollow hub slides vertically down around the motor-driven shaft. In order to provide a driving connection between the shaft and this hollow hub, the shaft is provided with axially extending driving coupling means, such as a flat face keyway or splines, or a square, or hexagonal shape may be provided to achieve the positive driving relationship. The hollow hub has complementary coupling means, such as internal lugs, keys, longitudinally extending relative to the length of the shaft for engaging the driving coupling means operatively associated with the rotatable drive shaft. One of these blades in the normal operating position of this cutter tool is positioned near the bottom of the working bowl along the length of the blade with a small spacing between the bottom of the bowl and this blade.

In this type of food processing apparatus, the rotary cutter tool may be driven at a speed in the range from approximately 750 revolutions per minute (R.P.M.) to 2,000 R.P.M. This rotary cutter tool may be used for different kinds of food processing, for example, for cutting or mincing meat, for cutting vegetables of all kinds, including condiments and for working and preparing doughs and pastes. Even a relatively small quantity of food material can be processed, if desired, because of the small spacing between the lower horizontal blade and the horizontal bottom of the working bowl, when the tool is in its normal operating position. The tool can also be used for preparing mayonnaise, or any other similar emulsion, because the lower blade is closely spaced to the bottom, thereby providing a highly effective shearing, emulsifying action when the cutter tool is in its normal operating position. Moreover, when shelled peanuts, or shelled cashew nuts, or other shelled nuts, are placed into the working bowl, the rotary cutter tool can process these nuts into peanut butter or cashew butter or other nut butter.

However, in making such nut butter, using the prior art apparatus, it has been my observation that the mass of partially chopped or pulverized nuts may tend to collect in the bottom of the bowl. The undesired result is that the lower blade sometimes tends to "ride up" or climb while moving like a hydrofoil rapidly through the mass of pulverulent food material. The clearance between the lower revolving blade and the bowl bottom progressively increases until this blade is skimming or skipping along over the upper surface of the food material. This is a dynamically stable state, wherein the lower blade is seen skimming at high velocity over a substantially undisturbed bed of chopped or pulverized nuts upon which it is moving. Once the cutter tool has ridden up into this dynamically stable lifted position, it will continue in that elevated location until the machine is shut off and the food material is manually pushed aside, so that the cutter can resume its normal down position fully seated relative to the drive shaft.

This failure of such prior art apparatus to complete the processing of shelled nuts into nut butter could unexpectedly occur any time. My experimental trials have shown that these unexpected conditions of the blade lift and climbing action up onto the top surface of the food mass are more likely to occur when there is only a modest quantity of nuts in the bowl bottom.

U.S. Pat. No. 3,493,022—Jean Mantelet does not state whether or not the mincing machine described therein can actually be used to process shelled nuts into nut butter. This Mantelet patent was cited during the prosecution of the Verdun patent mentioned above, and it is discussed herein in case the reader might consider it to be pertinent prior art. In the Mantelet mincing machine, the coupling between the blade-carrier hub and the driving spindle is produced by means of inclined ramps or fins wrought on the lateral surface of the spindle on which are engaged with a clearance correspondingly inclined grooves wrought in the lateral surface of a central bore of the hub. The inclination of these fins and grooves is selected, as specified by Mantelet, such that one rotation of the spindle in its normal direction of rotation tends to engage the fins in the grooves, that is to say, to draw the hub downwards. These inclined ramps or fins are said to provide an automatic engagement of the hub on the spindle as soon as the appliance is started and to ensure that the hub cannot fly off during operation in any case. Such inclined ramps or fins require a difficult manipulation of the tool during its installation or removal and thus is entirely different from the present invention in which the slicing blade itself dynamically produces a "negative lift" to hold the readily removable cutter tool in place on the drive shaft.

In U.S. Pat. No. 3,612,125—Hulmut Krauth, the upper exposed end of the rotatable output shaft of the motor is screw threaded, and a suitable nut is threaded onto this upper end, so as to maintain the sleeve-shaped carrier of the cutter blades in place. The use of such a fastening nut is time consuming for the user. Moreover, it tends to be unsanitary because food particles can lodge in the crevices between the nut and the exposed threaded end of the output shaft. Thus, this Krauth patent is entirely different from the present invention in which the slicing blade itself dynamically produces a negative lift to hold the readily removable cutter tool in place on its drive shaft.

SUMMARY OF THE INVENTION

In order to overcome this unexpected dynamic lifting action of the easily installed rotary cutter tool of the prior art, an improvement is incorporated into the rotary cutter tool. A downward inclination in a forward direction is provided in the lower blade, at least near its outer tip. If desired, such an inclination may be incorporated into both blades of the cutter tool. This downward inclination of the blade surface to provide a negative angle of attack ($-A$) relative to the direction of rotation may be accomplished by twisting the outer blade portion into a negative angle of attack relative to the remainder of the blade or by mounting the whole blade onto the hub at a negative angle of attack. Thus, as the lower blade slices at high velocity through a mass of food, there is a continuous impact of the food material against the downwardly inclined blade surface at least near the tip region of the blade producing a downward component of thrust for holding the tool hub down firmly seated in its proper relationship upon the rotating drive shaft.

In the presently preferred modified embodiment of the present invention, as mentioned above, the tip portion of the lower blade or of both blades is bent upwardly along a line of inflection to produce the downward inclination of the upper surface of the blade.

It is my present theory of the operation of the improved tool that the dynamic forces involved are a function of the square of the relative velocity between the rapidly moving blade and the food material, and so it is the outer portion of the blade which is dominant in producing the negative lift.

The various features, aspects and advantages of this invention will become more fully understood from a consideration of the following description of two illustrative embodiments of the invention when considered in conjunction with the accompanying drawings.

DETAILED DESCRIPTION

Figure 1:
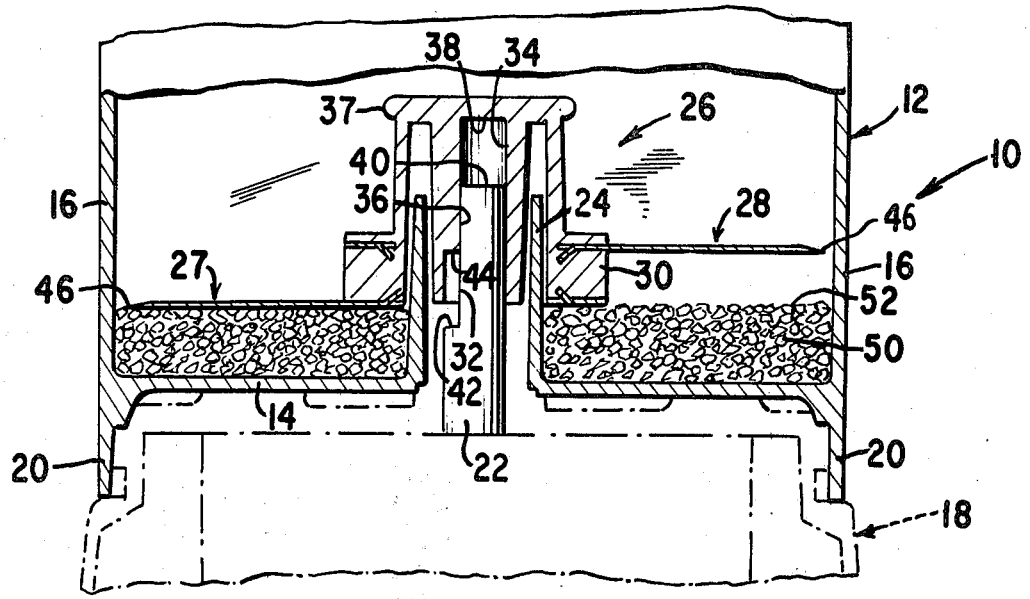
FIG. 1 is a partial elevational sectional view of the lower portion of a working bowl with a prior art rotary cutter tool therein, illustrating improper operation.

As shown in FIG. 1, there is rotary food processing apparatus 10 of the prior art including a working bowl or vessel 12 of generally cylindrical configuration including a horizontal bottom 14 and an upright side wall 16. This working bowl 12 may, for example, have an internal diameter of six inches or more, and for convenience of illustration, the top of the bowl is shown broken away. This bowl 12 is detachably mounted on a base 18 by a complementary engaging means, such as a plurality of lateral tenons on the housing of the base 18 engageable in corresponding notches in a skirt 20 which projects down below the bottom of the bowl 12, for example, as shown in detail and described in the Verdun patent mentioned above.

A vertical drive shaft 22 for driving a food processing tool extends up into the bowl 12 with its axis of rotation extending along the central axis of the bowl. The base 18 houses an electrically energized motor drive mechanism as is known in the prior art for rotating the drive shaft 22.

A central hole is formed through the vessel bottom 14 to permit the passage of the rotary driving shaft 22. In order to retain the food material being processed in the bowl, an upstanding annular wall 24 of relatively great height is formed integrally with the bottom 14. The height of this annular wall 24 is determined for providing in the lower portion of the vessel 12 a volume sufficient for containing the prepared food which may include juices, milk, vegetable oils, or other liquids, as processed in the apparatus 10.

Figure 2:
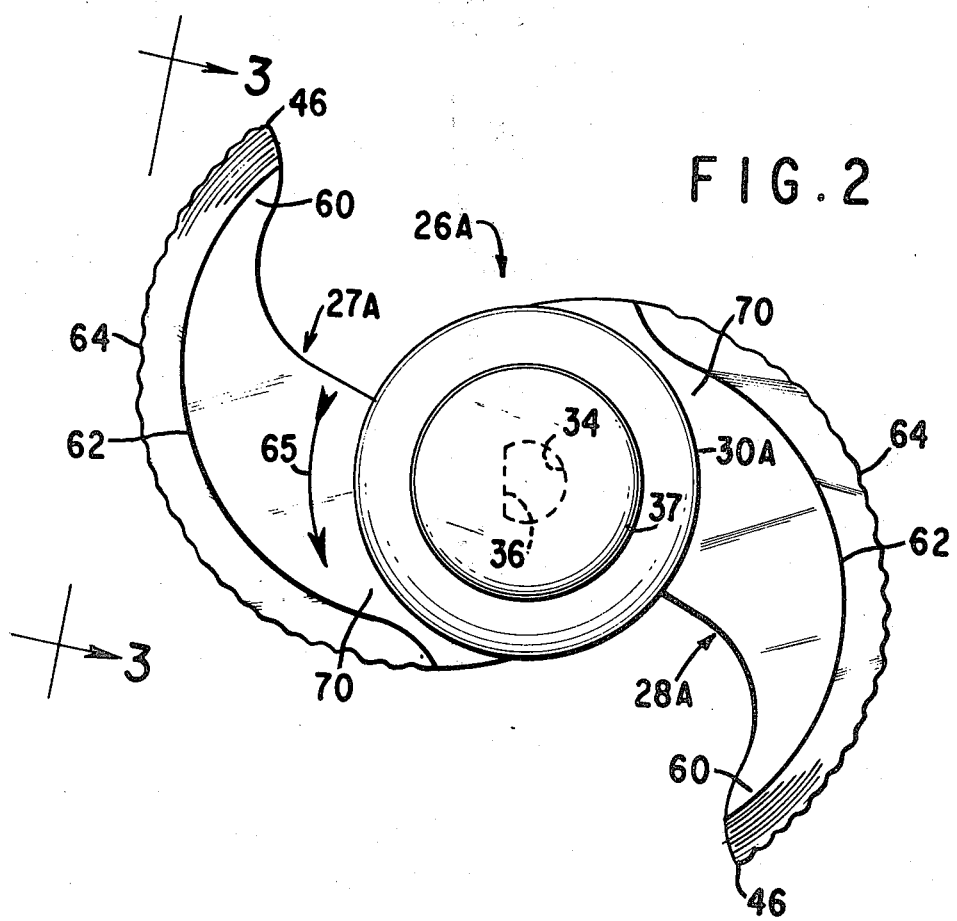
FIG. 2 is a plan view of a two-bladed rotary cutter tool embodying the present invention.

This food processor apparatus 10 may be equipped with a number of interchangeable tools adapted to be coupled to the drive shaft 22. One of these tools is a rotary cutter tool 26 including two thin rigid metal blades 27 and 28 which are rigidly secured into a hub 30 of rigid synthetic plastic material. In looking down upon the rotary cutter tool 26 of FIG. 1 in plan view, the user would see a tool which appears as shown in FIG. 2, except that the tool shown in FIG. 2 embodies the invention as will be explained further below. Looking again at FIG. 1, the blades 27 and 28 extend out from opposite sides of the hub and have their root portions molded into the hub 30, so that the blades and hub operate as an integral tool. Both blades 27 and 28 are parallel to the bottom 14 of the bowl and are suitably sharpened along their leading edges. The blade 27 is positioned at the bottom portion of the hub 30, while the other blade 28, which is on the diametrically opposite side of the hub as seen in plan view, is mounted significantly higher up on the hub. For example, the upper one may be positioned at an elevation which is ⅜ths of an inch or more higher than the lower one.

In order to provide a driving connection between the shaft 22 and the hub 30, the shaft 22 is formed with axially extending driving coupling means 32, such as a flat face or faces, square or hexagonal shape, keyway or splines. The hollow hub 30 has a socket 34 for receiving the shaft 22, and this socket 34 has complementary coupling means 36, such as axially extending flat face, square or hexagonal hollow, internal lugs, keys, or splines.

The rotary cutter tool 26 is manually installed on the drive shaft 22, or is manually removed therefrom, when the drive motor is de-energized and the shaft 22 is stationary. For convenience of the user in installing or removing the rotary cutter tool 26, there may be provided a knob-like handle 37 on the upper portion of the hub 30, and the complementary drive coupling means 32, 36 are axially extending components. That is, their interengageable driving and driven surfaces extend longitudinally with respect to the length of the shaft 22.

Therefore, the user can quickly and easily slide the hub 30 into its operating position upon the shaft 22 or conversely can readily remove the hub therefrom by using a straight-line motion vertically downwardly or upwardly. In other words, it is not necessary for the user to employ a screwing or unscrewing motion to install or remove the prior art cutter tool 26. Moreover, it is not necessary for the user to consume the time to employ any securing or locking device, such as a nut screwed onto the upper end of the shaft 22 for holding the hub 30 onto the shaft 22.

In normal operation, the hub 30 is intended to seat fully down relative to the shaft 22 with a stop surface of the hub resting down upon a corresponding stop associated with the shaft 22. These interengaging stop means serve to position the tool 26 in its operative location relative to the shaft 22. For example, the top 38 of the socket 34 and the top 40 of the shaft 22 may serve as interengaging positioning stop means for locating the tool 26 in its normal operating position. Alternatively, a shoulder surface 42 on the shaft 22 and a lower end surface 44 of the drive coupling means 36 may serve as interengaging stop means for locating this cutter tool in its proper operating position when the hub is slid onto the shaft 22.

Instead of directly sliding the hub 30 onto the drive shaft 22, an intermediate sleeve member, as known in the prior art (not shown), may be keyed to this shaft, and then the hub may, in turn, be engaged with axially extending driving coupling means formed on the exterior surface of such an intermediate sleeve member. Such intermediate sleeve member which is operatively associated with the drive shaft may also serve to provide positioning stop means for the rotary cutter tool 26.

Accordingly, as used herein, the term "a shaft provided with axially extending driving coupling means" is intended to include both,—(i) the situation where the hub directly slides down in straight-line motion (without screwing motion) onto and engages such coupling means formed on the shaft itself, or,—(ii) the situation where there is an intermediate coupling member or members operatively associated with the shaft and the hub slides down in straight-line motion onto such intermediate coupling member.

In normal operation, the blade 27 is intended to be located near the vessel bottom 14 along the length of the blade with a small spacing between the vessel bottom 14 and this lower blade. Moreover, this blade 27 may extend out with its outer end or tip 46 closely adjacent to the vessel side wall 16 for providing a very effective food processing operation for various kinds of foods. The upper blade 28 is shown with its tip 46 also located closely adjacent to the side wall 16.

The rotary cutter tool 26 may be used for different kinds of food processing, for example, for cutting or mincing meat, for cutting vegetables of all kinds, including condiments and for working and preparing doughs and pastes. A relatively small quantity of food material can be processed, if desired, because of the normally small spacing between the lower horizontal blade 27 and the horizontal bottom 14. The tool 26 can also be used for preparing a mayonnaise, or any other similar emulsion, because the lower blade 27 is closely spaced to the bottom 14 along its length, for example, with a spacing of the order of 5/32-nds of an inch (4 millimeters) or less, thereby providing a highly effective shearing, emulsifying action when the cutter tool 26 is in its normal operating position. Moreover, when shelled peanuts, or shelled cashew nuts, or other shelled nuts, are placed into the working bowl 12, the rotary cutter tool 26 can process these nuts into peanut butter or cashew butter or other nut butter.

However, in making such nut butter, using the prior art apparatus, as shown in FIG. 1, it has been my observation that the mass of partially chopped or pulverized nuts 50 may tend to collect in the bottom of the bowl and act like a fluidized bed of particulate matter through which the rapidly moving lower blade 27 is slicing as it revolves at, for example, 1,000 R.P.M. This blade has a radius to its tip 46 usually greater than 3 inches. Therefore, as it revolves in a circle of greater than one-half a foot in diameter, at 1,000 R.P.M., it is travelling with a tip speed of at least 1,570 feet per minute, which amounts to approximately 18 miles per hour. This relatively great velocity of the tip 46 of the blade 27 agitates the mass 50 of the partially chopped or pulverized nuts in a manner which I theorize to be somewhat analogous to a fluidized bed of material.

The undesired result is that the lower blade 27 sometimes tends to ride up or climb while moving like a hydrofoil rapidly as it slices through the food mass 50. The clearance between the lower revolving blade 27 and the bowl bottom 14 progressively increases until this blade 27 is skimming or skipping along over the upper surface 52 of the food material 50. This is a dynamically stable state, as shown in FIG. 1, wherein the lower blade 27 is seen skimming at high velocity over the surface 52 leaving substantially undisturbed the bed of chopped or pulverized nuts upon which it is moving in hydroplane fashion. The hub 30 is correspondingly lifted relative to the upper end of the shaft 22, as seen in FIG. 1.

In thin horizontal metal blades 27 and 28, as shown moving rapidly, I theorize that there is a chance for the blades, particularly the lower one, to flex or flutter slightly as they revolve at high speed, thereby allowing food particles to get under the lower blade to accumulate there in the bed 50.

Once the cutter tool 26 has ridden up into this dynamically stable lifted position, shown in FIG. 1, it will continue in that elevated location until the machine is shut off and the food material is manually pushed aside, so that the cutter 26 can resume its normal down position fully seated relative to the shaft 22.

This failure of the prior art apparatus 10 to complete the processing of shelled nuts into nut butter could unexpectedly occur any time. My experimental trials have shown that these unexpected conditions of the blade lift and climbing action up onto the top surface 52 of the food mass 50 are more likely to occur when there is only a modest quantity of nuts in the bowl bottom.

The leading edges of both blades 27A and 28A are suitably sharpened by grinding away their upper surfaces for a distance back away from the leading edge, as shown by the demarcation line at 62. The resultant sharpened leading edges 64 are thus located at the front of the lower surface of the respective blades. These sharpened leading edges 64 may be scalloped or serrated, or both, for enhancing the cutting or slicing action. The sharpened leading edge 64 of each blade is angled or swept rearwardly in the radial direction relative to the direction of rotation 65. As shown in FIG. 2, sharp leading edge 64 sweeps rearwardly in a continuous curve. This semi-crescent shape for each sweptback blade works to advantage in processing various foods, such as for slicing and mincing meats and for making nut butter. Such sharpened, curved, sweptback, semi-crescent-shaped blades, as seen in plan view in FIG. 2, but without the improvement claimed herein, have been provided in the prior art tool 26 of FIG. 1.

Figure 3:
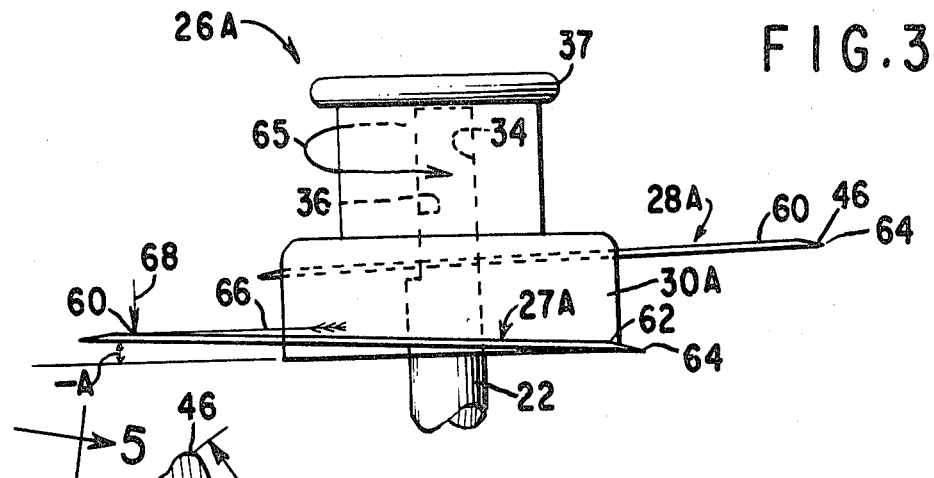
FIG. 3 is an elevational view of the rotary cutter tool of FIG. 2, as seen looking from the direction 3—3 in FIG. 2.

In order to overcome the unexpected dynamic lifting and hydroplane action, as seen in FIG. 1, of the rotary cutter tool of the prior art, an improvement is incorporated into the rotary cutter tool 26A, as seen in FIGS. 2 and 3. A downward inclination in the forward direction of rotation 65 is provided at least in the outer portion 60 of the lower blade 27A, particularly near its outer tip 46.

This downward inclination of the lower blade portion 60 near the tip 46 may be accomplished, as shown in FIG. 3, by mounting the whole blade 27A on the hub 30A at a negative angle of attach ($-A$) relative to the direction of rotation 65. The negative angle $-A$ is in the range from approximately 2° to 10° in the tip region 60 and preferably is in the range from approximately 2° to 6°. Thus, as shown in FIG. 3, as the lower blade 27A slices at high velocity through a mass of pulverulent food material, there is a continuous impact 66 of the food material against the downwardly inclined upper surface 60 near the tip region of the blade 27A.

This continuous impact 66 of food material is occurring at relatively high velocity against the forwardly downwardly inclined blade surface 60. Thereby, it develops a significant vertically downward component of thrust 68 or "negative lift" tending to push the hub 30A down for holding it seated down in its proper operating position relative to the drive shaft 22. If there is a sufficient depth of material in the working bowl 12, then the downwardly inclined upper surface 60 of the upper blade 28A also develops a downward thrust or a "negative lift". However, it is the lower blade 27A which is the more important one in this regard. Regardless of whether or not only a moderate amount of shelled nuts may be located in the working bowl, nevertheless, this lower blade 27A will be slicing through the mass of food material and will, therefore, develop the desired downward thrust 68.

Accordingly, the improved rotary cutter tool 26A is prevented by the dynamic operation of the rapidly revolving lower blade 27A from climbing upwardly relative to the drive shaft 22. It is my theory that the dynamic forces involved tend to be a function of the square of the relative velocity between the blade and the food particles through which it is slicing and against which it is impacting. Force equals mass times acceleration:

$$F = ma \quad (1)$$

The aggregate mass of food material "m" involved in the impact against the blade per unit time is a function of the volume being swept by the blade per unit time, which, in turn, is a function of relative blade velocity (v) through the food particles:

$$m = kv \quad (2)$$

where "k" is a constant of proportionality.

The relative magnitude of acceleration "a" occurring at any given radial distance from the axis of rotation is also a function of the relative blade velocity (v) through the food particles occurring at that radial distance.

$$a = k'v \quad (3)$$

where "k'" is another constant of proportionality. Substituting for "m" and "a" in equation (1) produces the result:

$$F = kk'v^2 = Kv^2 \quad (4)$$

where "K" is a composite function of proportionality. Thus, it is seen that the dynamic forces 66, 68 occurring on the inclined blade surface 60 near the tip region are dominant in my view, as compared with those dynamic forces occurring on the inner region 70 of the upper surface 60 near the hub 30A.

The reason that the outer portion of the blade is more important in developing the downward thrust is because this thrust is a function of the square of the relative velocity, as shown by equation (4) above, and the tip speed of the revolving blade is much greater than in the inner region 70 near the hub.

Figure 4:
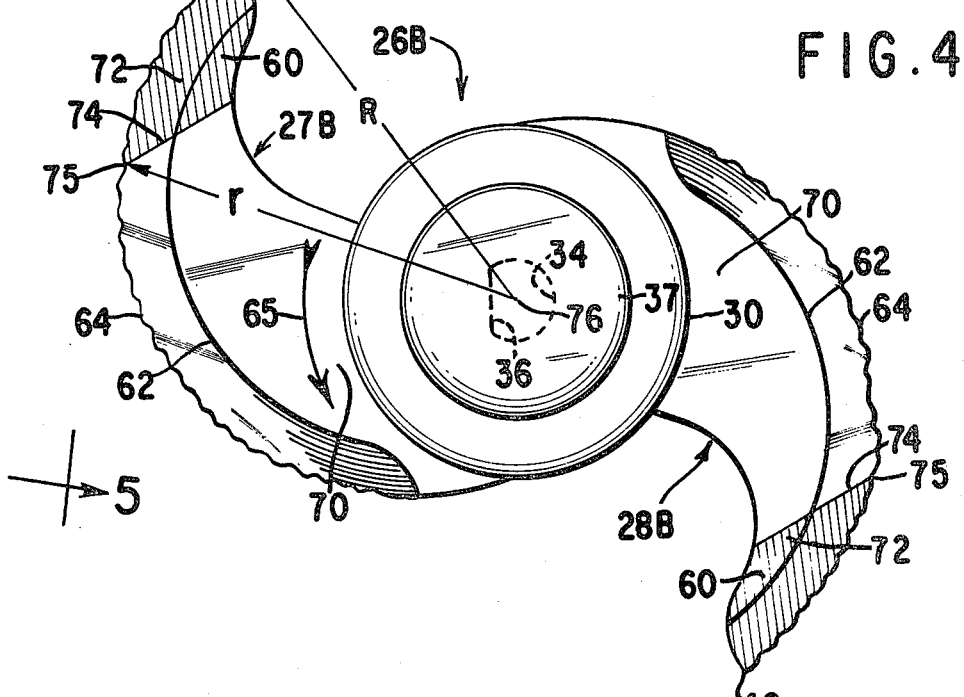
FIG. 4 is a plan view of a modified embodiment of the invention in a two-bladed rotary cutter tool.
Figure 5:
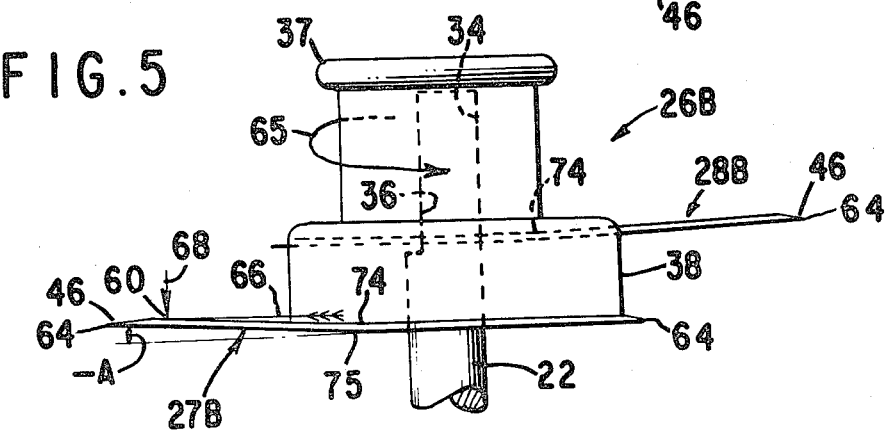
FIG. 5 is an elevational view of the rotary cutter tool of FIG. 4, as seen from the direction 5—5 in FIG. 4.

In the alternative embodiment 26B, as shown in FIGS. 4 and 5, the blades 27B and 28B are mounted in the hub 30 with their inner portions 70 substantially horizontal. In other words, these blades 27A and 28B may be mounted in the hub 30 in the same manner as in a prior art rotary cutting tool 26 (FIG. 1). However, as shown by the shaded area 72 in FIG. 4, the outer tip portion of at least the lower blade 27B or, if desired, of each blade is bent upwardly along an inflection bend 74. Thus, the upper surface 60 near the respective tips 46 is inclined downwardly relative to the direction of rotation 65. The downward inclination is shown as the angle $-A$, which is in the range discussed above. Once again, as indicated by the long arrow 66 in FIG. 5, the relatively great velocity of impact of the downwardly inclined tip portion 60 against the food material produces a downward component of thrust or negative lift 68 serving to hold the tool 26B firmly seated down in its normal operation position relative to the drive shaft 22.

Regardless of whether the theories of operation are correct as expressed herein, the improvement as described and claimed herein does produce advantageous operating results in preventing the easily installed rapidly rotating tool from climbing or riding upwardly relative to the drive shaft, regardless of the quantity or type of food material being processed.

The embodiment 26B of FIGS. 4 and 5 is presently preferred because the major portion of the cutting edge 64 of the lower blade 27B is closely spaced to the horizontal bottom 14 of the working bowl, preferably being spaced no more than 0.16 of an inch therefrom. For example, as shown in FIG. 4, the radius "R" to the tip 46 of the sharpened cutting edge 64 of the lower blade is approximately 3 inches, while the lesser radius "r" to the point 75 where the inflection bend 74 meets this cutting edge 64 is approximately 2.8 inches. Thus, in this embodiment, less than 10% of the radial distance R to the tip 46 of the cutting edge 64 is bent up to produce the negative angle of attack $-A$. The point 76 from which the radii "R" and "r" extend is the axis of rotation.

I claim:

1. In a rotary food processing apparatus having an upright working bowl with a vertical motor-driven shaft extending up into the bowl with its axis of rotation extending along the central axis of the bowl and in which a rotatable tool has a hub removably engaging down upon said drive shaft by a straight-line manual manipulation sliding vertically downwardly into driving relationship with straight axially extending driving coupling means associated with the shaft, and such tool has a plurality of thin rigid cutter blades secured to said hub and extending outwardly therefrom, a first lower one of said blades normally being positioned near the bottom of said vessel along the length of said blade with a small spacing between the bottom of said vessel and said first blade for permitting the operation of the apparatus with very small amounts of food, and a second one of said blades being positioned at a higher elevation on said hub, said first blade having a swept back shape with its outer end trailing behind its inner portion, the improvement comprising:

said rotatable tool at all times being freely removable from said drive shaft by lifting said hub vertically straight upwardly as said hub slides freely upwardly along said straight axially extending driving coupling means associated with the shaft, means for preventing said rotatable tool from inadvertently sliding upwardly along said straight axially extending driving coupling means of the shaft by preventing said lower blade from dynamically climbing upwardly during rotation through food material being processed, said preventing means including a downward inclination in the forward direction of rotation of at least a portion of said lower blade, for providing a negative angle of attack of said portion for developing a downward thrust on said portion of said lower blade as said lower blade revolves and moves at relatively high velocity through the food material in said working bowl.

2. In a rotary food processing apparatus, the improvement as claimed in claim 1, in which:

at least a portion, preferably an outer portion, of the upper blade is also provided with a downward inclination in the forward direction of rotation.

3. In a rotary food processing apparatus having an upright working bowl with a vertical motor-driven shaft extending up into the bowl with its axis of rotation extending along the central axis of the bowl and in which a rotatable tool has a hub removably engaging down upon said drive shaft by a straight-line manual manipulation sliding vertically downwardly into driving relationship with straight axially extending driving coupling means associated with the shaft, and such tool has a plurality of thin rigid cutter blades secured to said hub and extending outwardly therefrom, a first lower one of said blades normally being positioned near the bottom of said vessel along the length of said blade with a small spacing between the bottom of said vessel and said first blade for permitting the operation of the apparatus with very small amounts of food, and a second one of said blades being positioned at a higher elevation on said hub, said first blade having a swept back shape with its outer end trailing behind its inner portion, the improvement comprising:

said rotatable tool at all times being freely removable from said drive shaft by lifting said hub vertically straight upwardly as said hub slides freely upwardly along said straight axially extending driving coupling means associated with the shaft, means for preventing said rotatable tool from inadvertently sliding upwardly during food processing operation along said straight axially extending driving coupling means of the shaft by preventing said lower blade from dynamically climbing upwardly during rotation through food material being processed, said preventing means including a downward inclination in the forward direction of rotation of said lower blade for providing a negative angle of attack of said lower blade for developing a downward thrust on said lower blade as said lower blade revolves and moves at relatively high velocity through the food material in said working bowl.

* * * * *